United States Patent Office 3,038,556
Patented June 12, 1962

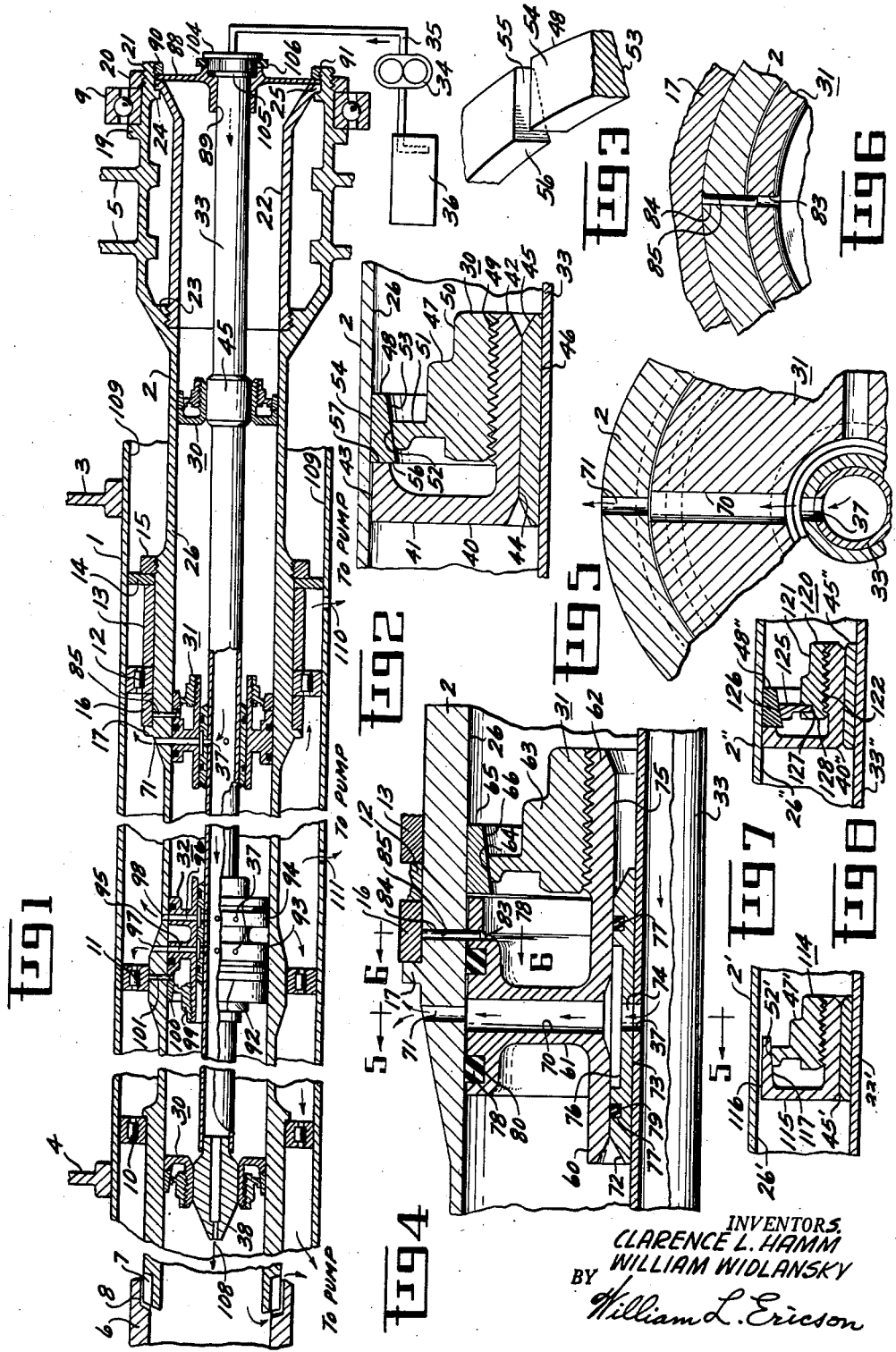

3,038,556
INTERNAL LUBRICATION TUBE STRUCTURE FOR HOLLOW SHAFTS
Clarence L. Hamm and William Widlansky, Marblehead, Mass., assignors to General Electric Company, a corporation of New York
Filed Oct. 22, 1959, Ser. No. 848,139
9 Claims. (Cl. 184—6)

This invention relates to an improved internal lubrication tube structure for hollow shafts, and more particularly to improved means for supporting such a tube in a hollow shaft of a gas turbine engine and for distributing lubricant therefrom to elements of the engine.

In many gas turbine engines, it is undesirable to lubricate shaft bearings through lubricant supply conduits extending radially outwardly of the bearings, because increased structural complexity and excessive heat transfer to the lubricant may result from such an arrangement. An example of such a gas turbine engine is one in which lubricant tubes so located must pass through a hot gas conduit, obstructing the conduit and causing transfer of heat to the lubricant. The structure becomes further complicated in engines which have concentric relatively rotatable hollow shafts, with bearings spaced radially between them.

For these reasons, it has become a common practice to supply lubricant to the bearings of gas turbine engines through a supply tube lying internally of a hollow shaft, or concentric shafts, along their rotational centerline, and spaced within the internal bore of the hollow shaft, to insulate the lubricant from the heat of the engine. Lubricant is fed into the tube at an end thereof projecting from the end of the hollow shaft, and supplies the shaft bearings and other elements through radial orifices in the tube and shaft.

The tube must be supported securely in the internal bore of the shaft, with the orifices of the tube and shaft in aligned and fluid-tight relationship. The normally high speed of rotation of the shaft also requires that the tube be restrained against whipping in the shaft bore, to prevent fatigue failure of the tube and dynamic imbalance of the rotary structure of the engine. These requirements have heretofore presented great difficulty of achievement, particularly where considerations of machining costs call for the formation of long shaft bores by ordinary boring tools. Such bores are often not truly cylindrical in form, and vary in diameter along their length.

It is an object of our invention to provide an improved lubrication tube structure having improved means for securely supporting the tube in radially spaced centered relation within the bore of a hollow shaft of a gas turbine engine, which is effective even though the bore is of varying diameter and is not truly cylindrical in form, and which is easily assembled and disassembled.

It is another object of our invention to provide an improved lubrication tube structure having improved means for supporting the tube in a hollow shaft of a gas turbine engine and for distributing lubricant from the tube to bearings of the shaft, which is easily positioned and secured positively with mating lubricant supply orifices of the tube and shaft in alignment for fluid flow communication.

Further objects and advantages of our invention will become apparent as the following description proceeds.

Briefly stated, in accordance with one embodiment thereof, we carry out our invention by providing at least one support means including a supporting body having a central opening receiving a lubrication tube in longitudinally slidable relation. A disc member having a frusto-conical rim is threaded on a portion of the body for movement along the longitudinal axis of the tube. The disc member circumferentially engages an inner frusto-conical surface of an expansible element, which may be a portion of the body or an expansion ring, whose outer diameter is less than the diameter of the shaft bore when in a contracted condition. The body, disc member, and expansible element are first inserted and positioned in the bore, and the disc member is then threaded along the body to drive the rim of the disc member into abutment upon the inner surface of the expansible element. The threading movement of the disc member causes expansion of the outer surface of the expansible element into locking engagement with the shaft bore, even though the bore may not be truly cylindrical in form. The lubrication tube is then longitudinally slid into the central openings of one or more supporting bodies spaced along the shaft bore, and secured in a predetermined position by other means external to the tube. These means comprise an end cap secured to an end of the tube, which is seated upon a corresponding end of the shaft.

We provide a further embodiment of our improved lubrication tube support for conducting lubricant between orifices in the tube and shaft, comprising a similar disc member, supporting body, and expansion element; but for this purpose we form radial connecting passages in the body, which are aligned with the orifices in a predetermined position of the body within the shaft bore and along the tube. In order to align the passages of the body with the shaft orifices, we form a pair of mating holes radially through these members. These holes are aligned to position the body within the shaft, and a locating pin is then inserted in the holes to insure proper alignment before the body is locked in the shaft bore. Proper alignment of the tube orifices with the passages of the body is obtained by means of the end cap previously referred to, which seats upon an end of the shaft when the tube reaches a predetermined position in the shaft.

While the specification concludes with claims particularly pointing out and distinctly claiming the subject matter which we regard as our invention, it is believed that the invention will be better understood from the following description taken in connection with the accompanying drawing, in which:

FIG. 1 is a view, partially in section, of a fragmentary portion of a turbine engine including a concentric hollow shaft arrangement and incorporating a preferred embodiment of our improved lubrication tube structure;

FIG. 2 is a view on an enlarged scale of a first one of the support means of FIG. 1;

FIG. 3 is a pictorial view of a broken-away portion of one of the elements of FIG. 2;

FIG. 4 is a view on an enlarged scale of a second one of the support means of FIG. 1;

FIG. 5 is a view taken along line 5—5 in FIG. 4, looking in the direction of the arrows;

FIG. 6 is a view taken along line 6—6 of FIG. 4, looking in the direction of the arrows;

FIG. 7 is a view in section of a fragmentary portion of a further embodiment of our improved support means; and FIG. 8 is a similar view of still a further embodiment of the support means.

Referring to FIG. 1, a portion of a turbine engine having a concentric arrangement of hollow shafts is shown by way of illustration, with several embodiments of our improved support means assembled with a lubrication tube to form the lubrication tube structure. The shaft arrangement shown includes an outer hollow shaft 1 and a concentric inner hollow shaft 2 of a conventional gas turbine engine of the turbo-shaft type. Outer shaft 1 supports and drivingly connects a turbine disc 3 and a compressor disc 4 near the ends thereof, forming a combustion products generator in combination with fuel combustion means (not shown). Disc 5 of a power turbine is supported by inner shaft 2, which drivingly connects the power turbine with a drive shaft 6 through splines 7 and 8, formed in an end of each of the shafts, respectively. The power turbine receives combustion products from the generator and extracts energy therefrom, transmitting this energy to an external load through rotary motion of shafts 2 and 6.

Shaft 1 is mounted in suitable bearings (not shown) in stationary portions of the engine, for axial thermal expansion. Shaft 2 is supported for relative rotation within shaft 1 by means for a thrust bearing 9 and a plurality of roller bearings 10, 11, and 12. Bearing 9 is supported in stationary portions of the engine (not shown). Bearing 12 is located between spacer rings 13 and 16, which space a sealing ring 14 along shaft 2. The assembly is locked in place by means of a nut 15, threaded on shaft 2, and a shoulder 17 formed on the shaft. Bearing 9 abuts a flange 19 of shaft 2, and is secured by means of a nut 20, threaded on an end 21 of the shaft.

In the configuration shown, a quill shaft 22 is threaded interiorly in shaft 2 at 23, to increase the rigidity of the power turbine section of the shaft. Adjacent end 21, shaft 2 is formed with a rabbet 24 against which a flange 25 of shaft 22 abuts, to form a rigid shaft structure. Hollow shafts 22 and 2 form a bore 26 extending along the rotational axis of the engine. The engine structure thus far described is of a conventional type well known in the art, and no further detailed description is believed necessary.

Our invention is directed toward an improved structure for supplying lubricant to the bearing means of a shaft arrangement such as has been described, as well as to other elements of the engine which it is desired to lubricate. It has previously been proposed to provide a flow of lubricant to these elements by means of a lubrication tube extending through the hollow shaft, along the rotational centerline thereof, and to feed lubricant into the tube at an end thereof which extends from an end of the shaft. Orifices are usually spaced along the length of the tube and at the opposite end thereof, to feed the lubricant to the various engine elements.

In the illustrative engine structure shown in FIG. 1, we provide a lubrication tube 33 within bore 26 of shafts 2 and 22. Lubricant is supplied to tube 33 by means of a pump 34 and conduit 35, from a tank 36. Orifices 37 are spaced along tube 33 for lubricating bearings 10, 11, and 12, and a nozzle 38 is secured to an end of the tube for lubricating splines 7 and 8. The lubricant tube must be securely supported in radially spaced centered relation within the shaft bore, and must be aligned properly to position the lubricant orifices for correctly feeding lubricant to the engine elements.

In order to realize these desired objectives, we provide support means 30, 31, and 32, representing several preferred forms for supporting the tube and distributing lubricant therefrom, or for performing the former function alone. These means are spaced along lubricant tube 33 as desired, according to the functions to be performed.

Referring to FIGS. 2 and 3, support means 30 is shown on an enlarged scale. In this embodiment, no lubricant distribution is provided for, and the function to be performed is that of supporting tube 33 in bore 26. For this purpose, we provide a supporting body 40 having a first flanged portion 41 and a second threaded portion 42 of reduced diameter. The periphery 43 of portion 41 is of a smaller diameter than bore 26, so that body 40 may be easily inserted in the shaft. The body is further formed with a central opening 44. A collar 45 is welded or otherwise secured at 46 to tube 33, and is received within opening 44 in radially-supporting axially-slidable relationship.

Means for securing body 40 in a desired position in bore 26 are provided, comprising a disc member 47 and an expansion element or ring 48. Member 47 is threaded upon body 40 at 49, for movement in an axial direction, and is given a hexagonal or other irregular cross-section at surface 50 for cooperation with a suitable wrench. Member 47 is further formed with a flange 51, having a frusto-conical rim 52.

Expansion ring 48 is formed with an inner annular frusto-conical surface 53 for cooperation with rim 52 of member 47. The outer annular surface 54 of the ring is cylindrical and of somewhat smaller diameter than bore 26 when in an unstressed, contracted condition. While ring 48 may be formed of any expansible material, or of a plurality of members arranged for relative expansion, we prefer to form it as a split ring having a radial sawcut 55 (FIG. 3). The ring is further formed with a radial face 56 for axial abutment upon a radial face 57 formed upon portion 41 of the body.

In assembling the lubrication tube structure in shaft 2, support means 30 is first inserted in bore 26. The disc member 47 is initially threaded along threads 49 far enough to maintain the assembly thereof with body 40 and ring 48, and the ring is in its contracted or relaxed condition, so that the support may easily be inserted in bore 26. An expanding collet chuck (not shown), having a handle of suitable length, is secured in opening 44, and is used to place the support in a desired location in bore 26. A socket wrench (not shown), having a hollow shaft sufficiently long to be operated from outside the bore, is inserted into the bore and over the chuck handle, and applied to surface 50 of disc member 47. The chuck and wrench are then relatively rotated to thread the disc member along portion 42 of the body in the direction of portion 41.

As disc member 47 is threaded along body 40, rim 52 engages surface 53 of ring 48, and forces face 56 of the ring into engagement with face 57 of body portion 41. Continued threading movement of the disc member causes radial expansion of the ring and engagement of outer surface 54 with bore 26, thus locking support 30 in position. Opening 44 is positioned concentrically within bore 26, and the support is securely locked in place, even though bore 26 may vary in diameter and not be truly cylindrical over its entire length.

Further embodiments of our improved lubrication tube support means are shown in FIG. 1, comprising support means 31 and 32. These support means serve the additional function of distributing lubricant from orifices 37 of tube 33, as well as supporting the tube in bore 26. Support means 31 is shown on an enlarged scale in FIGS. 4–6. Means are provided for performing the supporting function which are similar to those of support 30. These means comprise a supporting body 60 having a first flanged portion 61 and a second threaded portion 62 of reduced diameter, a disc member 63 threaded on the body and formed with a frusto-conical rim 64, and an expansible element comprising an expansion ring 65, having an inner frusto-conical surface 66. These elements cooperate in a manner identical to the elements of support means 30 to support tube 33 in radially spaced relation within bore 26.

For distributing lubricant from orifice 37 of the tube 33, a plurality of circumferentially spaced passages 70 are formed radially through portion 61 of the body, and a plurality of orifices 71 are formed through the wall of shaft 2, circumferentially spaced to mate with passages 70. A collar 72 receives tube 33 within a bore 73, and is brazed or otherwise secured to the tube. The collar is formed with a plurality of orifices 74 aligned with orifices 37. The body is formed with a central opening 75 for receiving the collar and tube in radially supporting axially slidable relationship. Orifices 74 communicate with an elongated groove 76 in the outer periphery of the collar, to provide some tolerance in the axial alignment of the orifices with passages 70, and to accommodate axial thermal expansion of the tube.

Means for sealing the space radially separating tube 33 from bore 26 of the shaft (which insulates the tube from heat transfer from the associated engine, are provided. These comprise pairs of conventional O-ring seals 77 and 78, which are seated in grooves 79 and 80 formed in collar 72 and the periphery of portion 61 of the body, respectively. Seals 77 and 78 engage opening 75 and bore 26 in fluid-sealing rotatable relation, respectively.

We provide improved means for aligning the lubricant distribution passages of supporting body 31 with the orifices of the shaft 2 and tube 33. In order to align passages 70 with orifices 71 of the shaft, portion 61 of the body and shaft 2 are formed with mating alignment holes 83 and 84, respectively. Support 31 is first positioned in bore 26 with the alignment holes matched, and a locating pin 85 is then inserted through the holes to secure the support in its aligned location. During operation of the associated engine, pin 85 is restrained against displacement by centrifugal force by means of bearing spacer 16, subsequently assembled on the shaft and located by means of a flange 17. Support means 31 is then locked in place in the same manner as support means 30, that is, by threading disc member 63 along body 60 to expand ring 65 into locking engagement with bore 26.

Referring again to FIG. 1, means for aligning orifices 37 of the tube with the passages of the supports are shown. These means comprise an end cap 88 having a hub 89, which receives an end of the tube 33 and is brazed or otherwise secured thereto. The end cap is spaced a predetermined distance from orifices 37, and is seated upon flange 25 of shaft 22, within end 21 of shaft 2. A nut 90 is threaded at 91 into the interior of shaft 2 to retain the end cap in assembled relation with the shaft. By these means, orifices 37 are aligned with the passages of the support means, which have previously been aligned with the orifices of shaft 2 by means of locating pins 85.

Support means 32, comprising a further embodiment of our improved lubrication tube structure, is similar in structure and function to support means 31, but is provided with a second row of lubricant distributing passages rather than a single one. A support of this kind is used where lubrication requirements call for two rows of orifices 37. For this purpose, a body 92 is provided with a pair of flanged portions 93 and 94, formed with a plurality of circumferentially spaced radial passages 95 and 96, respectively. Passages 95 and 96 are arranged to connect orifices 37 with rows of circumferentially-spaced orifices 97 and 98, respectively, formed in shaft 2.

Support means 32 is otherwise similar to support means 31, and comprises a disc member 99 and an expansion element or ring 100 for locking the support means in an aligned position of the orifices 97 and 98 and passages 95 and 96, established by means of a locating pin 101.

In the preferred arrangement of FIG. 1, support means 31 and one of support means 30 are arranged for access from end 21 of the shaft 2, and support means 32 and the other of support means 30 are arranged for access from the opposite end of the shaft. Support means 31 and 32 are first assembled in bore 26, and require a minimum wrench length for performing the locking operation, each being accessible from the nearest end of the shaft. Support means 30 are subsequently inserted in the bore and locked in place, each also being accessible from an end of the shaft nearest thereto.

Lubricant is supplied to tube 33 through a conduit 35 by means of a pump 34, from a tank 36. Fluid-tight connection is made between the conduit and the tube, which rotaates with shaft 2, by means of a stationary cylindrical nozzle 104, received for relative rotation within a cup 105 formed in end cap 88. An oil seal 106 is interposed between the peripheral surfaces of the nozzle and cup to prevent leakage of lubricant therebetween.

Lubricant flows in the direction of the arrows from nozzle 104 through tube 33 to orifices 37 and an orifice 108 of nozzle 38. The flow rate is controllable by the dimensions of these orifices, as well as by the rate of supply from pump 34.

Lubricant passes from orifices 37 outwardly through passages 70, 95, and 96, and orifices 71, 97, and 98, to the exterior of shaft 2, and flows axially along a bore 109 of shaft 1, in the directions shown by the arrows. The lubricant passes through bearings 10, 11, and 12, and returns to the pump through suitably spaced openings 110 and 111 formed in shaft 1, and by other suitable fluid conducting means (not shown). In the arrangement shown, lubricant flow in bore 109 is limited to the bearing area by means of sealing ring 14.

Lubricant also flows from orifice 108 of nozzle 38 to splines 7 and 8, and returns to the pump as indicated by the arrows.

In an alternative embodiment of our improved lubrication tube support means shown in FIG. 7 at 114, the expansion ring is eliminated, and the expansible element is incorporated in the supporting body. A supporting body 115 is formed of a sufficiently flexible material for direct cooperation with a disc member 47' having a frusto-conical rim 52', to lock the support in place. Body 115 has an elongated annular flange 116, formed with an inner frusto-conical surface 117, for this purpose. Flange 116 is urged into locking engagement with bore 26' of shaft 2' by threading the disc member along the body in a direction to engage rim 52' with the flange. Support means 114 is otherwise similar in structure and function to support means 30, and may be provided with lubricant distributing passages similar to those of support means 31 and 32.

Still a further embodiment of our support means is shown at 120 in FIG. 8. This support differs from support 30 in that a member 121, threaded on a body 40'' at 122, is formed separately from a disc member 125 having a frusto-conical rim 126. Disc member 125 is secured upon a necked-down portion 127 of member 121 by means of an upset flange 128, for relative rotation of these members. The elements of the support are otherwise similar to those of support 30, and are similarly numbered with double prime superscripts. In this embodiment the torque necessary to lock expansion ring 48' in place is reduced, because the friction torque occasioned by relative rotation of members 121 and 125 is less than that occasioned by relative rotation of member 47 and ring 48 of support 30, in view of the smaller radius of its application.

From the foregoing description, it will be seen that we have provided an improved lubrication tube structure having improved means for securely supporting a lubrication tube within the bore of a hollow shaft of a gas turbine engine, and for distributing lubricant therefrom to the parts of the engine. Our improved lubrication tube structure is easily assembled with the lubricant distributing orifices and the passages of the supports in proper alignment, and provides secure support even though the bore of the associated hollow shaft is not truly cylindrical.

It will be apparent that any desired combination of support means 30, 31, 32, 114, and 120 may be utilized, according to the requirements of any given application. Support means 30, 114, or 120 are preferably provided at intervals along a length of the lubrication tube requiring support, but not provided with lubricant orifices.

Various modifications to the supporting means will occur to those skilled in the art.

While we have shown and described particular embodiments of our invention, it will be obvious to those skilled in the art that various additional modifications may be made without departing from the true spirit and scope of our invention.

What we claim and desire to secure by Letters Patent of the United States is:

1. In a gas turbine engine, a shaft formed with a longitudinally extending bore, turbine means drivingly engaged with said shaft, bearing means disposed about said shaft for supporting said shaft for rotation about an axis extending along said bore, lubrication means including an elongated hollow lubrication tube of smaller diameter than said bore extending within said bore along said axis for supplying lubricant from an end of said shaft to said bearing means, said shaft formed with an orifice in a peripheral wall thereof, said tube being in lubricant flow communication with said bearing means through said orifice, at least one supporting body receivable within said bore, said body having a central opening receiving said tube in axially slidable radially supporting engagement therein, said body further having a first flanged portion and a second threaded portion, a disc member threaded upon said second portion for threading movement along said axis, said disc member formed with a frusto-conical rim of smaller diameter than said bore, and an expansion ring having an inner frusto-conical annular surface and an outer cylindrical surface, said cylindrical surface of smaller diameter than said bore in a contracted condition of said ring, said rim engaging said annular surface of said ring to force said ring against said first portion and to expand said ring into locking engagement with said bore to lock said ring, said disc member, and said body in said bore upon threading movement of said disc member in one direction along said axis.

2. The combination recited in claim 1, said tube formed with an orifice, said body formed with a radially extending passage through said first portion thereof for alignment with said orifices of said shaft and said tube to connect said orifices in lubricant flow relation.

3. The combination recited in claim 2, said shaft and said body each formed with a radially-extending alignment hole, said holes positioned to be in alignment in one relative position of said shaft and said body in which said orifices of said shaft and said tube are aligned with said passage, and a locating pin receivable in said holes to secure said shaft and said body in said one relative position.

4. In a gas turbine engine, a shaft formed with a longitudinally extending bore, turbine means drivingly engaged with said shaft, bearing means disposed about said shaft and supporting said shaft for rotation about an axis extending along said bore, lubrication means including an elongated hollow lubrication tube of smaller diameter than said bore extending within said bore along said axis, said shaft formed with at least one orifice in the periphery thereof, said tube being in lubricant flow communication with said bearing means through said orifice, at least one supporting body receivable within said bore, said body having a central bore receiving said tube in axially slidable supporting engagement therein, said body further having a first flanged portion and a second threaded portion, a disc member threaded upon said second portion for threading movement along said axis, said disc member formed with a frusto-conical rim of smaller diameter than said bore, an expansion ring having an inner frusto-conical annular surface and an outer cylindrical surface, said cylindrical surface of smaller diameter than said bore in a contracted condition of said ring, said rim engaging said annular surface of said ring to force said ring against said first portion and to expand said ring into locking engagement with said bore to lock said ring, said disc member, and said body in said bore upon threading movement of said disc member in one direction along said axis, said tube formed with an orifice, said body formed with a radially extending passage through said first portion for alignment with said orifices to connect said orifices in fluid-flow relation, means for locating said body in a predetermined position to align said passage with said orifices of said shaft and said tube, and an end cap secured to said tube in a predetermined position, said shaft formed at an end thereof with a seat receiving said end cap to align said orifices of said tube and said shaft with said passage.

5. In a gas turbine engine, a drive shaft mounted for rotation about a longitudinal axis and formed with a bore extending along said axis, said shaft formed with at least one orifice in a peripheral wall thereof, lubrication means including a hollow lubrication tube of smaller diameter than said bore and extending in radially spaced relation therein along said axis, at least one orifice formed in a peripheral wall of said tube, a supporting body disposed within said bore and having a central opening receiving said tube in supporting engagement therein, said body formed with a radially extending passage for alignment with said orifices of said shaft and said tube to connect said orifices in lubricant flow relation to supply lubricant to the exterior of said shaft, a disc member threaded upon said body for threading movement along said axis, said disc member formed with a frusto-conical rim, and an expansible ring having a frusto-conical surface, said rim engaging said frusto-conical surface for expanding said ring into a locking engagement with said bore upon threading movement of said disc member in one direction along said axis.

6. In a gas turbine engine, a shaft formed with a longitudinally extending bore, turbine means drivingly engaged with said shaft, bearing means disposed about said shaft and supporting said shaft for rotation about an axis extending along said bore, said shaft formed with at least one orifice in a peripheral wall thereof, lubrication means including an elongated hollow lubrication tube for supplying lubricant from an end of said shaft to said bearing means, said tube extending in radially spaced relation within said bore along said axis, said tube formed with at least one orifice in a peripheral wall thereof, a supporting body disposed in said bore, said body having a central opening receiving said tube in supporting engagement therein, said body formed with a radially extending passage for alignment with said orifices of said shaft and said tube to connect said orifices in lubricant flow relation so as to supply lubricant to said bearing means, an expansion ring formed with an outer peripheral surface of smaller diameter than said bore in a contracted condition of said ring, and a member adjustably mounted on said body and engaging said ring, said member being movable on said body to a position in which said member expands said ring into locking engagement with said bore to support said tube in radially spaced relation to said bore.

7. In a gas turbine engine, a shaft formed with a longitudinally extending bore, turbine means drivingly engaged with said shaft, bearing means disposed about said shaft and supporting said shaft for rotation about an axis extending along said bore, said shaft formed with at least one orifice in a peripheral wall thereof, lubrication means including an elongated hollow lubrication tube for supplying lubricant from an end of said shaft to said bearing means, said tube extending in radially spaced relation within said bore along said axis, said tube formed with at least one orifice in a peripheral wall thereof, a supporting body disposed in said bore, said body formed with a central opening receiving said tube in supporting engagement therein, said body formed with a radially extending passage for alignment with said orifices of said shaft and said tube to connect said orifices in lubricant flow relation so as to supply lubricant to said bearing means, a disc member threaded on said body for threading movement along said axis, said disc member formed with a frusto-conical rim of smaller diameter than said bore, and an expansion ring having a circumferential frusto-conical surface and a peripheral surface, said rim engaging said frusto-conical surface for expanding said ring into locking engagement with said bore to lock said body in said bore upon threading movement of said disc member in one direction along said axis.

8. In a gas turbine engine, a shaft mounted for rotation about a longitudinal axis and formed with a bore extending along said axis, an orifice in a peripheral wall of said shaft, lubrication means including a hollow lubrication tube for supplying lubricant, an orifice in a peripheral wall of said tube, said tube extending in radially spaced relation within said bore along said axis, a supporting body disposed in said bore, said body having a central opening receiving said tube in supporting engagement therein, a radially extending passage in said body for alignment with said orifices to connect said orifices for supplying lubricant from said tube to the exterior of said shaft, an expansion ring formed with an outer peripheral surface of smaller diameter than said bore in a contracted condition of said ring, and a member adjustably mounted on said body and engaging said ring, said member being movable on said body to a position in which said member expands said ring into locking engagement with said bore to support said tube in radially spaced relation to said bore.

9. The combination recited in claim 8, said shaft and said body each formed with a radially-extending alignment hole, said holes positioned to be in alignment in one relative position of said shaft and said body in which said orifices of said shaft and said tube are aligned with said passage, and a locating pin receivable in said holes to secure said shaft and said body in one relative position.

References Cited in the file of this patent

UNITED STATES PATENTS

| | | |
|---|---|---|
| 2,542,967 | Waechter | Feb. 20, 1951 |
| 2,693,248 | Gaubatz et al. | Nov. 2, 1954 |
| 2,734,749 | Benjamin | Feb. 14, 1956 |
| 2,804,280 | Wheatley | Aug. 27, 1957 |
| 2,866,522 | Morley et al. | Dec. 30, 1958 |
| 2,830,821 | Bystrom | Apr. 15, 1958 |